United States Patent [19]

Beer et al.

[11] Patent Number: 4,788,993
[45] Date of Patent: Dec. 6, 1988

[54] VEHICLE RECIPROCATING SPRAY WASHING APPARATUS

[75] Inventors: Carl C. Beer, Philadelphia; C. Lee Hewitt, Feasterville, both of Pa.; Sherman Larson, Palmyra, N.J.

[73] Assignee: Sherman Industries, Incorporated, Palmyra, N.J.

[21] Appl. No.: 877,243

[22] Filed: Jun. 23, 1986

[51] Int. Cl.⁴ .............................................. B08B 3/02
[52] U.S. Cl. .................................... 134/123; 134/172; 134/180; 134/181; 118/314; 118/323; 239/752
[58] Field of Search ............... 134/123, 129, 144, 172, 134/180, 181; 239/752, 264; 118/314, 323; 68/205 R

[56] References Cited

U.S. PATENT DOCUMENTS

| | | | |
|---|---|---|---|
| 1,989,562 | 1/1935 | Smith | 68/205 R |
| 3,274,860 | 9/1966 | Gauthier et al. | 239/752 X |
| 3,289,449 | 12/1966 | O'Brien | 118/323 X |
| 3,445,286 | 5/1969 | Smith, Jr. et al. | 134/29 X |
| 3,827,262 | 8/1974 | Manuel | 68/205 R X |
| 4,231,239 | 11/1980 | Lazaroff | 134/181 X |

FOREIGN PATENT DOCUMENTS

| | | | |
|---|---|---|---|
| 474260 | 8/1969 | Switzerland | 134/181 |
| 1019278 | 2/1966 | United Kingdom | 134/180 |

Primary Examiner—Harvey C. Hornsby
Assistant Examiner—Frankie L. Stinson
Attorney, Agent, or Firm—Ratner & Prestia

[57] ABSTRACT

Vehicle washing apparatus positioned above or at the side of the path followed by a vehicle to be washed. For side washing apparatus, pairs of spaced nozzles are reciprocated in a vertical plane to provide vertical coverage. The nozzles of a pair are angled toward each other, so that one nozzle sprays the front of the vehicle as the vehicle approaches, both nozzles spray the side of the vehicle as the vehicle passes, and the other nozzle sprays the rear of the vehicle as it departs. For top washing apparatus, the pairs of spaced nozzles are reciprocated in a horizontal plane to provide horizontal coverage. The angle nozzles contribute to the washing of the front and rear of a vehicle in addition to washing the top surfaces.

18 Claims, 3 Drawing Sheets

VEHICLE RECIPROCATING SPRAY WASHING APPARATUS

TECHNICAL FIELD

The present invention relates, in general, to vehicle cleaning and, in particular, to side and top washing apparatus for washing vehicles.

BACKGROUND ART

Many automatic vehicle washers are currently in use. Typically, automatic vehicle washers have a number of stations at which a vehicle, moving through the washer, is sprayed with cleaning liquid, scrubbed and brushed, and dried.

Generally, the cleaning liquid sprayers are in the form of nozzle arrays through which cleaning liquid is ejected under pressure as the vehicle passes the nozzles. Some of these nozzle arrays are positioned at the sides of the path along which the vehicle is moved, so that the sides of the vehicle can be cleaned and above the path of vehicle movement for cleaning the top surfaces of vehicles.

Typically, side sprayers and top sprayers are arranged to be effective in cleaning only the surfaces of the vehicle which the sprayers face. The center lines of the nozzles are perpendicular to the surfaces of the vehicle, so that the spray from the nozzles impinges only on those surfaces of the vehicle.

U.S. Pat. No. 4,562,848 to Messing, et al, shows a side sprayer in which the nozzles are arranged in a single-line, vertical array which is reciprocated vertically. The array of nozzles also is pivotted, so that the nozzles spray the front of the vehicle as it approaches the nozzles, the sides of the vehicle as the vehicle passes the nozzles, and the rear of the vehicle as it leaves the nozzles. In this way, the side sprayer also contributes to the cleaning of the front and the rear of the vehicle.

The side spray apparatus described in U.S. Pat. No. 4,562,848 is fairly complex in construction. The superimposing of pivotal movement of the nozzle array on vertical reciprocation of the nozzle array requires highly accurate design and fabrication of many cooperating parts for the apparatus to be effective and reliable.

DISCLOSURE OF THE INVENTION

Accordingly, vehicle washing apparatus, constructed in accordance with the present invention, includes a support frame and first and second elongated members mounted on the support frame for pivotal movement about first and second axis, respectively. A first pair of nozzles is secured to the first elongated member at spaced apart points and a second pair of nozzles is secured to the second elongated member at spaced apart points. The center lines of the first pair of nozzles are angled toward each other in a plane perpendicular to the plane within which the first elongated member moves and the center lines of the third and fourth nozzles are angled toward each other in a plane perpendicular to the plane within which the second elongated member moves. The vehicle washing apparatus also includes drive means for reciprocating the first and second elongated members about the first and second axis, respectively, to reciprocate the nozzles. The vehicle washing apparatus further includes a fluid source and means for conducting fluid from the fluid source to the nozzles.

BRIEF DESCRIPTION OF THE DRAWINGS

Referring to the drawings.

BEST MODE FOR CARRYING OUT THE INVENTION

Figure 1:
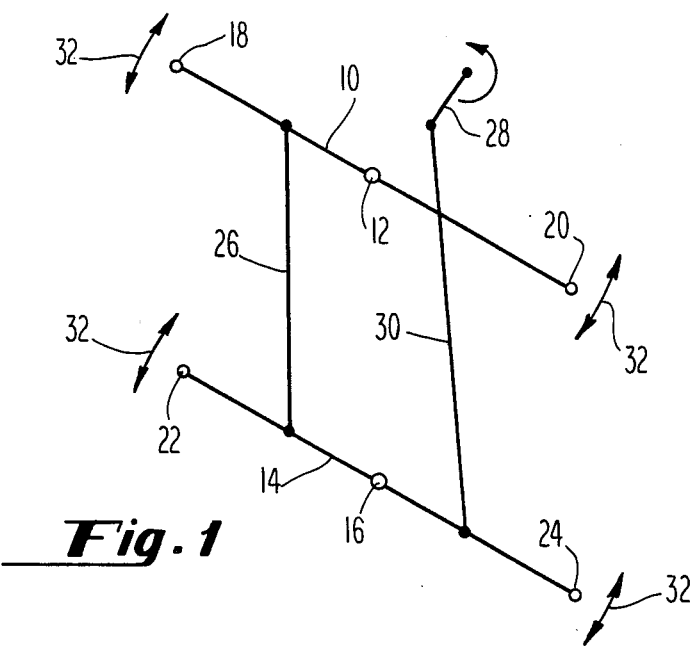
FIG. 1 is a schematic representation of the operation of vehicle washing apparatus constructed in accordance with the present invention.

Referring to FIG. 1, vehicle washing apparatus, constructed in accordance with the present invention, includes a first elongated member 10 mounted for pivotal movement about a first axis 12 and a second elongated member 14 mounted for pivotal movement about a second axis 16. A first pair of nozzles 18 and 20 are secured to elongated member 10 at spaced apart points and a second pair of nozzles 22 and 24 are secured to elongated member 14 at spaced apart points. A straight-line linkage 26, which is parallel to and of equal length with the straight line between pivot axes 12 and 16, is connected between elongated members 10 and 14.

As rotary movement is imparted to a crank 28, a link 30, coupled to crank 28, causes elongated member 14 to pivot about axis 16. As elongated member 14 pivots about axis 16, elongated member 10, connected to elongated member 14 by straight-line linkage 26, pivots about axis 12. With straight-line linkage 26 parallel to and of equal length with the straight line between axes 12 and 16, elongated members 10 and 14 pivot about their respective axis maintaining the parallel relationship illustrated in FIG. 1. The reciprocating movement imparted to elongated members 10 and 14 imparts a reciprocating movement to nozzles 18, 20, 22, and 24, as represented by arrows 32.

Figure 3:
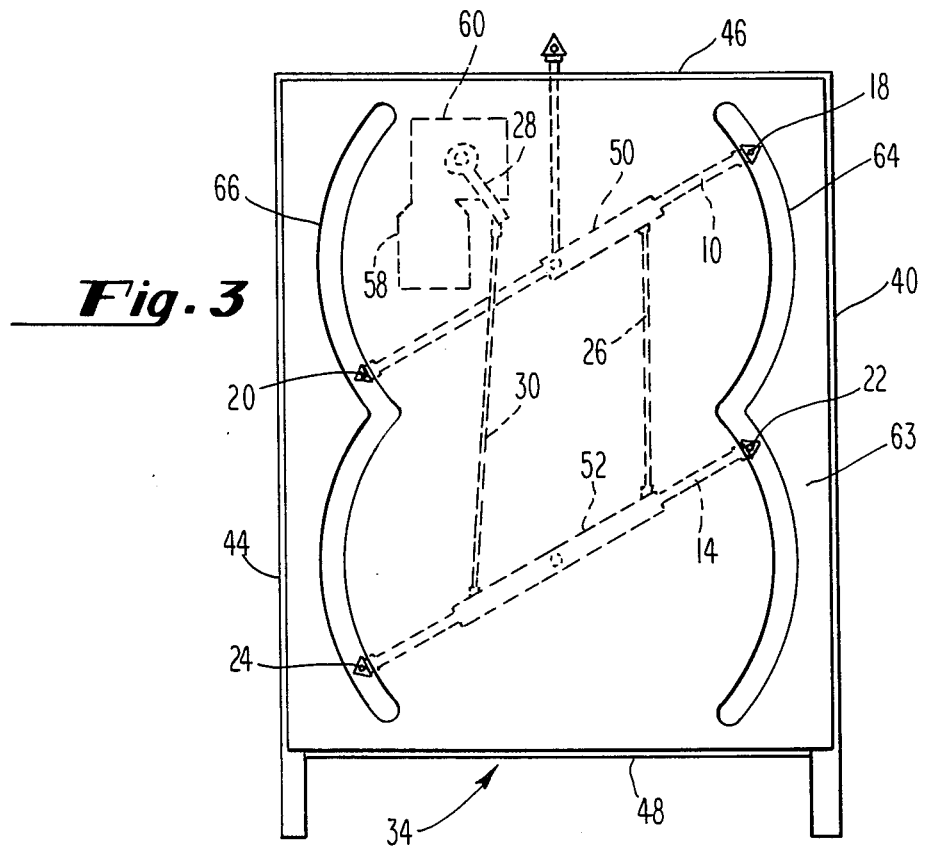
FIG. 3 is a front view, on a reduced scale, of the FIG. 2 apparatus.
Figure 2:
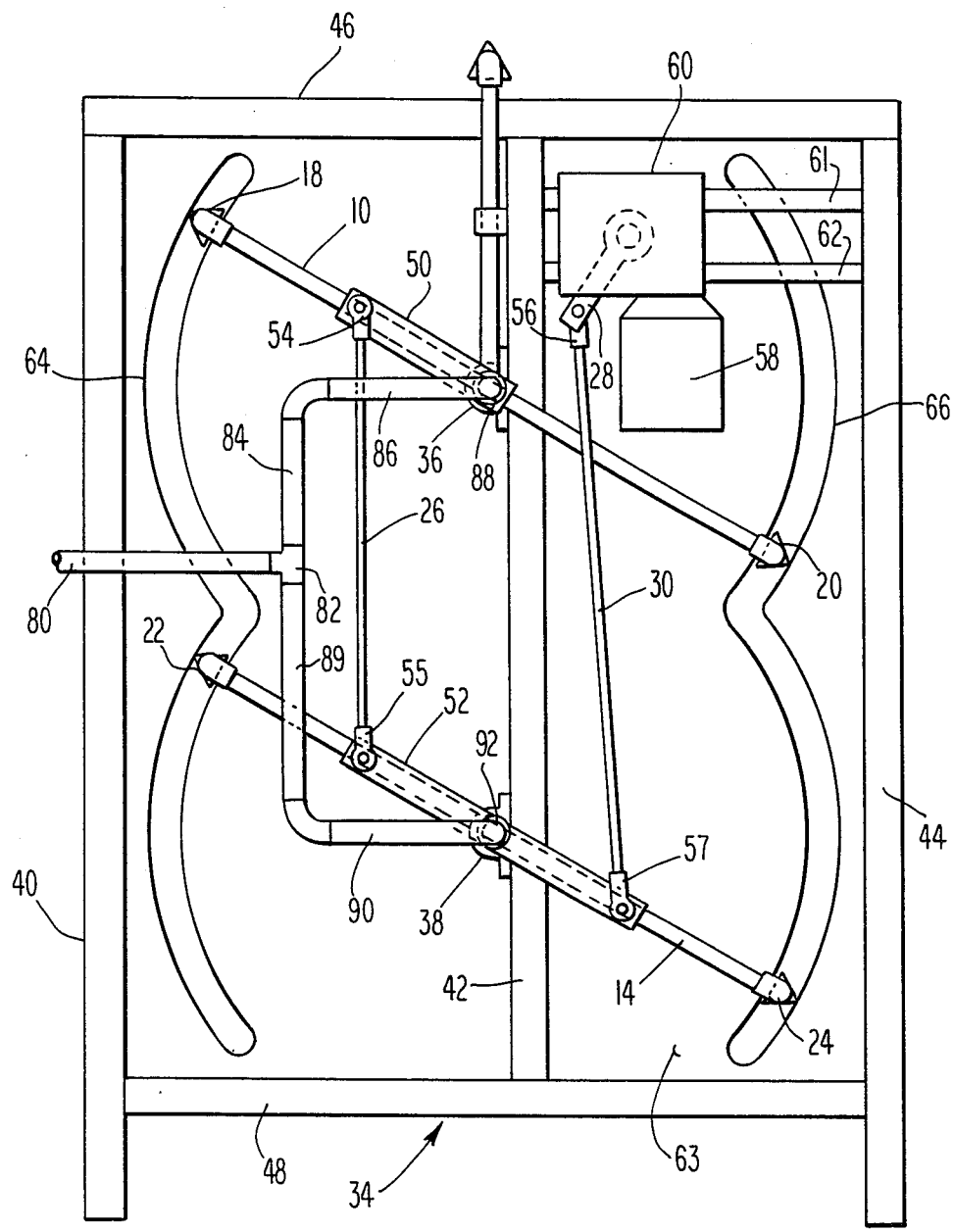
FIG. 2 is a rear view of side spray vehicle washing apparatus constructed in accordance with the present invention.

Referring to FIGS. 2 and 3, which illustrate the present invention as a side sprayer, elongated members 10 and 14 are mounted on a support frame 34 by means of a pair of bearings 36 and 38, respectively. The support frame illustrated in FIGS. 2 and 3 includes a plurality of vertical members 40, 42, and 44 and a pair of horizontal members 46 and 48. Bearings 36 and 38, by means of which elongated members 10 and 14 are mounted for pivotal movement, are attached to vertical member 42 of the support frame.

Elongated members 10 and 14 are mounted on support frame 34 to reciprocate within a common vertical plane. The spacing between nozzles 18 and 20 is the same as the spacing between nozzles 22 and 24, so that nozzles 18 and 22 are aligned vertically and nozzles 20 and 24 are aligned vertically.

Elongated member 10 carries a sleeve 50 and elongated member 14 carries a sleeve 52. Sleeves 50 and 52 are fixed against movement along the axes of their respective elongated members in a manner to be described below and, therefore, each can be considered a part of its respective elongated member. Straight-line linkage 26 is connected between elongated members 10 and 14 by means of suitable couplings 54 and 55 which permit relative pivotal movement between linkage 26 and elongated members 10 and 14. In particular, each of the couplings 54 and 55 receives one end of linkage 26 and is pivotally connected to the respective sleeve 50 or 52.

Linkage 30 is connected between crank 28 and elongated member 14 by means of suitable couplings 56 and 57 which permit relative pivotal movement between linkage 30 and crank 28 and between linkage 30 and elongated member 14. In particular, each of the couplings 56 and 57 receives one end of linkage 30 and is pivotally connected to the respective crank 28 or sleeve 52.

Reciprocating movement is imparted to elongated members 10 and 14 by means of a motor 58, the output of which is coupled through a gear box 60 to crank 28 and linkage 30. Specifically, the output of motor 58 is coupled through gear box 60 to produce a rotary movement at the output of the gear box. This causes crank 28 to rotate and impart a reciprocating movement to linkage 30 which, in turn, causes elongated members 10 and 14 to reciprocate. Typically, elongated members 10 and 14 are reciprocated at a rate of 60 cycles per minute. Motor 58 and gear box 60 are mounted on support frame 34 by suitable means, such as a pair of horizontal members 61 and 62.

For the embodiment of the invention illustrated in FIGS. 2 and 3, elongated members 10 and 14 are pivotted through an angle of approximately 60°. In order to minimize the wear on various components as the elongated members are pivotted, this angle should not exceed 90°. The selection of the pivot angle is dependent upon the desired spray coverage and the preference to limit the curvature of the paths followed by the nozzles. By limiting the pivot angle to 90°, the paths of movement of the nozzles are more flat than for pivot angles which are greater.

In order to shield the mechanism previously described from liquid splashing from a vehicle being washed, support frame 34 preferably includes a splash plate 63. Splash plate 63 has cut-outs 64 and 66 through which nozzles 18, 20, 22, and 24 project. The shape of cut-outs 64 and 66 corresponds to the paths of movement of the reciprocating nozzles.

Figure 4:
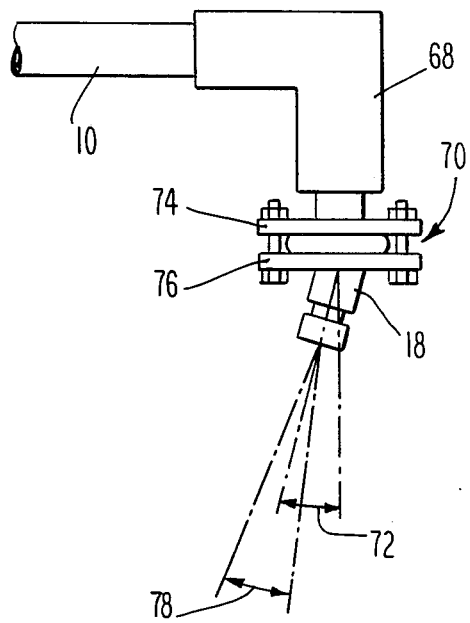
FIG. 4 is a top view showing the details of the nozzles used in the apparatus of FIGS. 2 and 3.

FIG. 4 shows the orientation of the nozzles relative to the elongated member to which the nozzles are secured. Nozzle 18 is used as the example.

Nozzle 18 is secured to elongated member 10 by means of a 90° elbow 68 and an adjustment assembly 70. The center line of nozzle 18 is at an angle 72 relative to a line which is perpendicular to the side of a vehicle being washed. This angle is set by clamping a spherical portion of nozzle 18 in place between two plates 74 and 76.

By setting the center lines of the nozzles at an angle to a line perpendicular to the side of the vehicle, the side spraying apparatus also sprays the front and the rear of the vehicle. Angle 72 can be up to 20°. The preferred range for angle 72 is 10° to 15° and the most preferred setting of angle 72 is 10°. The particular angle selected is dependent upon other variables, such as the speed of travel of the vehicle, the spray pattern of the nozzles, and the spacing between the spray apparatus and the vehicle, and how the variables collectively produce optimum spray coverage (front, rear and side surfaces).

Nozzle 20, at the opposite end of elongated member 10, is set at a similar, but opposite, angle, so that the center lines of nozzles 18 and 20 are angled toward each other in a plane perpendicular to the plane within which elongated member 10 moves. Preferably, nozzles 22 and 24 are set at similar angles, so that the center lines of nozzles 18 and 22 are parallel and the center lines of nozzles 20 and 24 are parallel.

Angle 78 represents the spread in the spray pattern of the nozzles. Angle 78 can be up to 45°. The preferred range for angle 78 is 5° to 15° and the most preferred spread is 15°. The particular angle selected is dependent upon other variables, such as the rate and extent of the angular swing of the elongated members, the degree of angling of the center lines of the nozzles, and the spacing between the spray apparatus and the vehicle, and how the variables collectively produce optimum spray coverage.

Returning to FIG. 2, fluid under pressure is introduced through a pipe 80. The fluid flow splits at a T-section 82 with half the fluid flow going to elongated member 10 and the other half going to elongated member 14. In particular, elongated members 10 and 14 preferably are tubes through which fluid is conducted to the nozzles secured to the open ends of the respective elongated members. Fluid is conducted from T-section 82 to elongated member 10 by means of pipes 84 and 86 and a suitable coupling 88 which extends from pipe 86 through sleeve 50 into the interior of elongated member 10. Similarly, fluid is conducted from T-section 82 to elongated member 14 by means of pipes 89 and 90 and a suitable coupling 92 which extends from pipe 90 through sleeve 52 into the interior of elongated member 14. With couplings 88 and 92 extending through sleeves 50 and 52, respectively, the sleeves are constrained from moving along the axes of their respective elongated members. With the arrangement just described, elongated members 10 and 14 serve the dual purpose of mounting the nozzles at the desired points and conducting fluid to the nozzles.

Figure 5A:
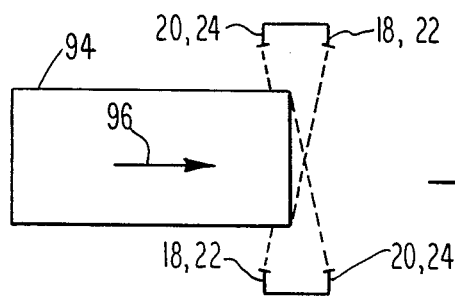
FIGS. 5A, 5B, and 5C illustrate schematically the operating sequence of side spray vehicle washing apparatus constructed in accordance with the present invention.
Figure 5B:
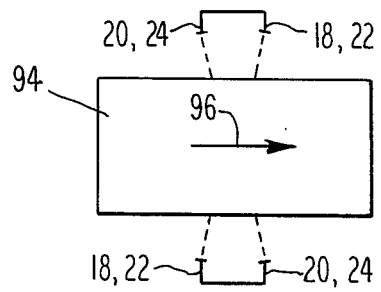
Figure 5C:
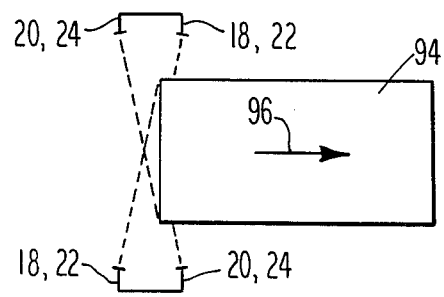

FIGS. 5A, 5B, and 5C illustrate the manner in which vehicle washing apparatus, constructed in accordance with the present invention, washes the front, sides and rear of a vehicle. It will be understood that such apparatus is disposed on both sides of a vehicle, so that both sides can be cleaned.

A vehicle to be cleaned is represented by reference numeral 94 in FIGS. 5A, 5B, and 5C. The arrows, identified by reference numeral 96 in these figures, represent the direction of movement of vehicle 94.

As vehicle 94 approaches the vehicle washing apparatus, the spray produced by the angled nozzles 18 and 22 extends across the front of the vehicle, while the spray produced by the angled nozzles 20 and 24 impinges against the side of the vehicle, with some of the spray extending into the inside of a wrap-around bumper on the front of the vehicle. The vertical reciprocation of the nozzles provides vertical coverage of the vehicle by the sprays from the nozzles.

As vehicle 94 moves from the position shown in FIG. 5A to the position shown in FIG. 5B, the extent of the sprays produced by nozzles 18 and 22 moves from the passenger side of the vehicle to the driver side of the vehicle. FIG. 5B illustrates one position of vehicle 94, relative to the washing apparatus, at which all of the spray impinges against the side of the vehicle.

As vehicle 94 moves from the position shown in FIG. 5B to the position shown in FIG. 5C, the extent of the sprays produced by nozzles 20 and 24 moves from the driver side of the vehicle to the passenger side of the vehicle. The spray produced by the angled nozzles 18 and 22 impinges against the side of the vehicle with some of the spray extending into the inside of a wrap-around bumper on the rear of the vehicle.

As indicated previously, vehicle washing apparatus, constructed in accordance with the present invention, is positioned on both sides of a vehicle being washed, so that both sides of the vehicle can be cleaned. Preferably, such side spray washers are positioned opposite one another along the path of movement of the vehicle. With such an arrangement, the reciprocating movements of the nozzles must be synchronized, so that there is minimum interference between the sprays coming from the opposite sides of the vehicle when the front and the rear of the vehicle are being sprayed. This is accomplished most simply by cycling the nozzles, so that they are 180° out of phase. In this way, while one pair of nozzles is at its high point, the corresponding pair of nozzles on the opposite side of the vehicle is at its low point. With such operation, interference from the oppositely directed sprays is limited to the region of crossover of the sprays. Of course, with the vehicle at positions where the sprays extend to less than one-half the width of the vehicle, there is no interference between oppositely directed sprays.

Figure 6:
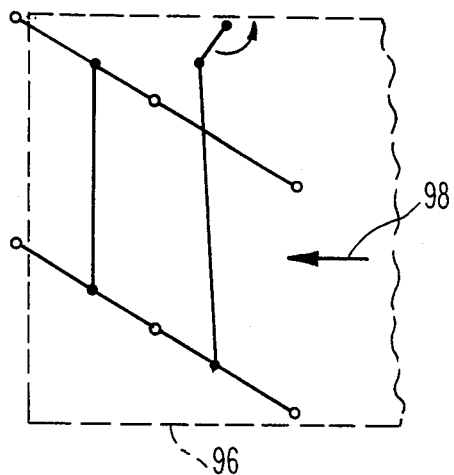
FIG. 6 is a schematic illustration of the application of the present invention to a top sprayer.

The present invention also can be incorporated in a top or overhead spray apparatus. FIG. 6 illustrates a vehicle 96 passing beneath the spray apparatus in the direction of an arrow 98. With the nozzles angled toward each other, substantially vertical front and rear surfaces on vehicle 96 are sprayed in addition to the top surface.

The setting of the angles of the center lines of the nozzles and the selection of the spray pattern spread for the nozzles are generally the same for both the side and top sprayers. However, for the top sprayer, the most preferred spread for the spray pattern is 5° to 10°, rather than 15° for the side sprayer, because of the increased spacing between the top sprayer and the top surfaces of the vehicles being washed.

The foregoing has set forth an exemplary and preferred embodiment of the present invention. It will be understood, however, that various alternatives will occur to those of ordinary skill in the art without departure from the spirit or scope of the present invention.

We claim:

1. Vehicle washing apparatus for washing a moving vehicle comprising:
    a support frame;
    a first member longitudinally elongated and mounted on said support frame for pivotal movement about a first transverse axis;
    first and second nozzles secured to said first elongated member at spaced apart points;
    a second member longitudinally elongated and mounted on said support frame for pivotal movement about a second transverse axis;
    third and fourth nozzles secured to said second elongated member at spaced apart points;
    drive means for reciprocating said first and second elongated members about said first and second transverse axes, respectively, to move each entire nozzle vertically along a path defined by an arc;
    a fluid source;
    and means for conducting fluid from said fluid source to said nozzles whereby the nozzles are positioned on the respective first and second members and the first and second members are pivoted so that the fluid substantially covers a portion of the vehicles three dimensional surface.

2. Vehicle washing apparatus according to claim 1 wherein said first and second elongated members reciprocate within a common vertical plane.

3. Vehicle washing apparatus according to claim 2 wherein said first and third nozzles are aligned vertically and said second and fourth nozzles are aligned vertically.

4. Vehicle washing apparatus according to claim 3 wherein said center lines of said first and third nozzles are parallel and said center lines of said second and fourth nozzles are parallel.

5. Vehicle washing apparatus according to claim 4 wherein said drive means include:
    (a) a source of rotary movement,
    (b) a first linkage between said source of rotary movement and one of said elongated members, and
    (c) a second straight-line linkage between said elongated members which is parallel to and of equal length with a straight line between said first and second axes.

6. Vehicle washing apparatus according to claim 5 wherein said support frame includes a splash plate having cut-outs corresponding to the paths of movement of said reciprocating nozzles and through which said nozzles project.

7. Vehicle washing apparatus according to claim 6 wherein said drive means are mounted on said support frame.

8. Vehicle washing apparatus according to claim 6 wherein said elongated members are tubular, said nozzles are connected to open ends of said elongated members, and said fluid is conducted to the interiors of said elongated members.

9. Vehicle washing apparatus according to claim 6 wherein said drive means are mounted on said support frame.

10. A car washing system comprising:
    a first and a second vehicle washing apparatus according to claim 2 positioned on both sides of a path along which a vehicle to be washed moves; said second vehicle washing apparatus facing said first vehicle washing apparatus.

11. A car washing system according to claim 10 wherein said first and second vehicle washing apparatus are positioned opposite one another and said system includes means for synchronizing the reciprocations of opposed nozzles to be 180° out of phase.

12. A car washing system according to claim 11 further including a third vehicle washing apparatus according to claim 13 positioned above said path.

13. Vehicle washing apparatus according to claim 1 wherein said first and second elongated members reciprocate within a common horizontal plane.

14. Vehicle washing apparatus according to claim 13, wherein said first and third nozzles are aligned horizontally and said second and fourth nozzles are aligned horizontally.

15. Vehicle washing apparatus according to claim 14 wherein said center lines of said first and third nozzles are parallel and said center lines of said second and fourth nozzles are parallel.

16. Vehicle washing apparatus according to claim 15 wherein said drive means include:
    (a) a source of rotary movement, (b) a first linkage between said source of rotary movement and one of said elongated members, and (c) a second straight-line linkage between said elongated members which is parallel to and of equal length with a straight line between said first and second axes.

17. Vehicle washing apparatus according to claim 16 wherein said elongated members are tubular, said nozzles are connected to open ends of said elongated members, and said fluid is conducted to the interiors of said elongated members.

18. Vehicle washing apparatus according to claim 1 wherein the center lines of said first and second nozzles angle toward each other in a plane perpendicular to the plane within which said first elongated member mover and the center lines of said third and fourth nozzles angle toward each other in a plane perpendicular to the plane within which said second elongated member moves.

* * * * *